Patented June 13, 1933

1,914,311

UNITED STATES PATENT OFFICE

KARL VIEWEG, OF FRANKFORT-ON-THE-MAIN, GERMANY, ASSIGNOR TO DEUTSCHE GOLD & SILBER SCHEIDEANSTALT, VORMALS ROESSLER, OF FRANKFORT-ON-THE-MAIN, GERMANY, A CORPORATION

PROCESS FOR THE INCORPORATION OF ACTIVE OXYGEN IN ORGANIC COMPOUNDS

No Drawing. Application filed August 14, 1930, Serial No. 475,391, and in Germany August 21, 1928.

The purpose of my invention consists in incorporating active oxygen in organic compounds, for instance, aldehydes, alcohols, ketones, especially of the terpene group, to give these or preparations thereof the effect of active oxygen, or the combined effect resulting from the effects of the organic compounds themselves and of the active oxygen respectively. A long time ago, E. v. Behring attempted to bring together formaldehyde and hydrogen peroxide in equimolecular quantity. The result was products of a more powerful effect in accordance with the probable formation of highly active organic peroxides. The practical value of the so manufactured preparations was but a very low one, the solutions being too unstable.

Now I have found that compositions of hydrogen peroxide-phosphate are most suitable to incorporate active oxygen into organic compounds. I obtained solid stable products out of which usable solutions or emulsions can be manufactured.

In carrying out my invention it is advantageous to use such perphosphates which possess per se a good stability, for instance, which contain to 1 molecule of pyrophosphate about 2 molecules of hydrogen peroxide or to 1 molecule of disodiumphosphate about 1 molecule of hydrogen peroxide or less. Such compounds may be manufactured in a very simple way, for instance as follows:

1 molecule of pyrophosphate is mixed with 2 molecules of hydrogen peroxide, if necessary with a relatively low excess of hydrogen peroxide, for instance in such a way, that 223 gms. of crystalline sodium pyrophosphate are treated with 113 ccm. of 30% hydrogen peroxide. The hydrogen peroxide in excess (not bound) is then removed by distillation in vacuo. In a similar manner stable hydrogen peroxide-dialkali-phosphate compounds may be obtained. The products can be totally or nearly totally dehydrated by heating, if necessary in vacuo and preferably by crushing or the like, in order to improve their stability.

The following example gives exact figures about the manufacture of these compounds:

1 kg. of crystalline sodium pyrophosphate is treated in a round glass flask with 513 gms. of 30% hydrogen peroxide by stirring. The water and the hydrogen peroxide in excess are then distilled off in vacuo; at the end of the distillation the contents of the flask are crushed and dried in vacuo to constant weight. Yield: 740 gms. of sodium pyrophosphate-hydrogen peroxide with a content of hydrogen peroxide of 19.20%.

These hydrogen peroxide-phosphate compounds are then brought into reaction under suitable conditions with organic compounds, as for instance paraformaldehyde, formaldehyde, menthol, menthone, thymol or the like in such a way that the components are well mixed together or triturated homogeneously.

Examples (1) 95 gms. of the above mentioned sodium pyrophosphate-hydrogen peroxide are triturated homogeneously with 5 gms. of menthol in a china mortar. The so obtained product has a content of hydrogen peroxide of 18% and may be used in this form or in tabloids.

(2) 6 gms. of paraformaldehyde are well mixed in a ball mill with 94 gms. of sodium pyrophosphate-hydrogen peroxide. The resulting very fine powder has a content of hydrogen peroxide of 17.8%.

The components may react upon each other in a dry, solid form or partially liquid, partially solid, or in the presence of limited quantities of solving or emulsive materials which can be removed later, for instance, by evaporation in vacuo or other commercial methods.

The manufacture of the preparations may be carried out in stoichiometric proportions, for instance, in such a way that solid formaldehyde and the compositions of pyrophosphate are used in the proportion of 1 $CH_2O$ to 1 $H_2O_2$. On the other hand, one or the other of the components may be employed in excess. The best suited proportions are to be found out empirically.

In some cases the organic compounds can be treated with a suitable mixture of pyrophosphate and hydrogen peroxide, for instance, containing to 1 molecule of pyrophosphate a little more than 2 molecules of hydrogen peroxide with the precaution that the remaining hydrogen peroxide and other liquid components of the mixture (water) are removed by cautious drying.

Instead of pure organic compounds, mixtures, for instance those containing various efficient (disinfecting or antiseptic) components or those containing efficient components in mixture with inefficient ones, may be treated as described.

The so obtained products may be converted, if necessary, in suitable forms such as tabloids, creams, ointments, pastes, powders and so on, if desired, by the assistance of filling materials, products favoring the solubility and the like.

My invention shows the new technical advantage that by using perphosphates contrary to the employment of hydrogen peroxide or other compounds of hydrogen peroxide stable preparations are obtained which frequently show effects even more considerable than the joint effects of the single components.

What I claim is:

1. A process for producing a complex organic compound containing active oxygen, which consists in reacting an organic compound selected from the group consisting of alcohols, aldehydes and ketones, with hydrogen peroxide-phosphate compounds.

2. A process for producing a complex organic compound containing active oxygen, which consists in reacting an organic compound selected from the group consisting of aldehydes and ketones, with hydrogen peroxide-phosphate compounds.

3. A process for producing a complex organic compound containing active oxygen, which consists in reacting an organic compound containing the carbonyl radical with perpyrophosphates, the perpyrophosphates containing one molecule of pyrophosphate to substantially every two molecules of hydrogen peroxide.

4. A process for producing a complex organic compound containing active oxygen, which consists in reacting an organic compound selected from the group consisting of alcohols, aldehydes, and ketones, with perpyrophosphates, the said perpyrophosphates containing substantially two molecules of hydrogen peroxide for every molecule of pyrophosphate.

5. A process for producing a complex organic compound containing active oxygen, which consists in reacting an organic compound containing the carbonyl radical with perphosphates, the said perphosphates containing substantially one molecule of disodium phosphate for every molecule of hydrogen peroxide.

6. A process for producing a complex organic compound containing active oxygen, which consists in reacting an organic compound selected from the group consisting of alcohols, aldehydes, and ketones, with a perphosphate compound containing substantially one molecule of disodium phosphate to every molecule of hydrogen peroxide.

Signed at Brussels, in the Province of Brabant and Kingdom of Belgium, this 26th day of July, A. D. 1930.

KARL VIEWEG.